United States Patent
Fenner et al.

(10) Patent No.: US 10,096,393 B2
(45) Date of Patent: Oct. 9, 2018

(54) NUCLEAR RADIATION PARTICLE POWER CONVERTER

(71) Applicant: Medtronic, Inc., Minneapolis, MN (US)

(72) Inventors: Andreas Fenner, Chandler, AZ (US); David A. Ruben, Mesa, AZ (US); Anna J. Malin, Mesa, AZ (US); Paul F. Gerrish, Phoenix, AZ (US); Bruce C. Fleischhauer, Chandler, AZ (US); Larry E. Tyler, Mesa, AZ (US)

(73) Assignee: Medtronic, Inc., Minneapolis, MN (US)

( * ) Notice: Subject to any disclaimer, the term of this patent is extended or adjusted under 35 U.S.C. 154(b) by 505 days.

(21) Appl. No.: 14/666,890

(22) Filed: Mar. 24, 2015

(65) Prior Publication Data
US 2015/0279491 A1 Oct. 1, 2015

Related U.S. Application Data

(60) Provisional application No. 61/972,551, filed on Mar. 31, 2014.

(51) Int. Cl.
*G21H 1/02* (2006.01)
*G21H 1/06* (2006.01)
(Continued)

(52) U.S. Cl.
CPC ............... *G21H 1/02* (2013.01); *G21C 19/07* (2013.01); *G21H 1/04* (2013.01); *G21H 1/06* (2013.01); *Y10T 29/49117* (2015.01)

(58) Field of Classification Search
CPC ............... G21H 1/02; G21H 1/04; G21H 1/06
(Continued)

(56) References Cited

U.S. PATENT DOCUMENTS

| 4,855,879 A | 8/1989 | Soltani et al. |
| 5,721,462 A | 2/1998 | Shanks |

(Continued)

FOREIGN PATENT DOCUMENTS

| WO | WO 2009/103974 A1 | 8/2009 |
| WO | WO 2011/089611 A1 | 7/2011 |

(Continued)

OTHER PUBLICATIONS

Andres Cuevas et al, "Charge Carrier Separation in Solar Cells", listed in IEEE Journal of Photovoltaics, vol. 5, No. 1, Jan. 2015.*

(Continued)

*Primary Examiner* — John K Kim

(57) ABSTRACT

Various embodiments of a nuclear radiation particle power converter and method of forming such power converter are disclosed. In one or more embodiments, the power converter can include first and second electrodes, a three-dimensional current collector disposed between the first and second electrodes and electrically coupled to the first electrode, and a charge carrier separator disposed on at least a portion of a surface of the three-dimensional current collector. The power converter can also include a hole conductor layer disposed on at least a portion of the charge carrier separator and electrically coupled to the second electrode, and nuclear radiation-emitting material disposed such that at least one nuclear radiation particle emitted by the nuclear radiation-emitting material is incident upon the charge carrier separator.

15 Claims, 8 Drawing Sheets

(51) Int. Cl.
*G21C 19/07* (2006.01)
*G21H 1/04* (2006.01)

(58) Field of Classification Search
USPC .......................................... 310/305; 29/825
IPC ...................................................... G21H 1/02
See application file for complete search history.

(56) References Cited

U.S. PATENT DOCUMENTS

| | | | | |
|---|---|---|---|---|
| 8,134,275 | B2* | 3/2012 | Kavetsky | G21G 4/06 136/253 |
| 2006/0021647 | A1* | 2/2006 | Gui | B82Y 10/00 136/252 |
| 2007/0099359 | A1 | 5/2007 | Klimov et al. | |
| 2008/0314435 | A1* | 12/2008 | He | B82Y 20/00 136/246 |
| 2011/0152321 | A1* | 6/2011 | Lawson | C07D 209/14 514/323 |
| 2011/0291210 | A1* | 12/2011 | Batchelder | G21H 1/06 257/429 |
| 2012/0081013 | A1 | 4/2012 | Frazier et al. | |
| 2012/0145532 | A1* | 6/2012 | Smolyakov | B01J 21/063 204/157.44 |
| 2012/0161575 | A1* | 6/2012 | Choi | G21H 1/06 310/303 |
| 2012/0186637 | A1 | 7/2012 | Batchelder | |
| 2013/0015059 | A1* | 1/2013 | Haryu | C25B 1/04 204/257 |
| 2013/0098440 | A1* | 4/2013 | Hodes | H01G 9/204 136/256 |
| 2013/0264907 | A1* | 10/2013 | Lee | G21H 1/06 310/303 |
| 2015/0279491 | A1* | 10/2015 | Fenner | G21H 1/02 310/305 |

FOREIGN PATENT DOCUMENTS

| | | |
|---|---|---|
| WO | WO 2011/125024 A1 | 10/2011 |
| WO | WO 2014/191718 A1 | 12/2014 |
| WO | WO 2015/153187 A1 | 10/2015 |

OTHER PUBLICATIONS (PCT/US2015/022188) PCT Notification of Transmittal of the International Search Report and the Written Opinion of the International Searching Authority, dated Sep. 15, 2015, 10 pages.

Califano et al., "Efficient inverse Auger recombination at threshold in CdSe nanocrystals," *Nano Letters*, 2004; 4(3):525-531.

Jasim, "Dye Sensitized Solar Cells—Working Principles, Challenges and Opportunities," Chapter 8 in *Solar Cells—Dye Sensitized Devices*. Kosyachenko (Ed.). Published by InTech. 2011.

McDaniel et al., "An integrated approach to realizing high-performance liquid-junction quantum dot sensitized solar cells," *Nature Communications*, Dec. 10, 2013; 4:2887.

Mora-Seró et al., "Recombination in Quantum Dot Sensitized Solar Cells," *Accounts of Chemical Research*, 2009; 42(11):1848-1857.

*Polymers, Phosphors, and Voltaics for Radioisotope Microbatteries*, Bower et al. (Eds). CRC Press, Taylor & Francis Group, Boca Raton, FL. 2002. pp. 20-36.

Sims et al., "High Efficiency GaP Power Conversion for Betavoltaic Applications," Proceedings Paper published in the *Proceedings of the 13th Space Photovoltaic Research and Technology Conference (SPRAT 13)*, Sep. 1, 1994. pp. 373-382.

Xu et al., "Development of a beta radioluminescence nuclear battery," *Nuclear Science and Technique*, 2014; 25:040603.

International Search Report and Written Opinion dated Sep. 15, 2015 for International Application No. PCT/US2015/022188; 9 pages.

* cited by examiner

NUCLEAR RADIATION PARTICLE POWER CONVERTER

This application claims the benefit of U.S. Provisional Application No. 61/972,551, filed Mar. 31, 2014, which is incorporated herein by reference in its entirety.

BACKGROUND

Radiation particle power converters can convert energy from a radioactive source that emits high-energy electrons, e.g., beta particles, into electrical energy. The power converter can convert the energy of the high-energy electrons to electrical energy, i.e., current, by collecting electron-hole pairs that are formed by the high-energy electrons that are incident upon a semiconductor material of the power converter.

One such power converter includes a radiation-emitting radioisotope and a plurality of semiconductor substrates. Each of the plurality of semiconductor substrates includes a junction for converting nuclear radiation particles to electrical energy, e.g., a p-n junction. The junction collects electron-hole pairs that are created within the semiconductor material as a result of interaction with the nuclear radiation particles. Specifically, when a radiation particle of sufficient energy impacts the semiconductor material, electrons in the semiconductor material are excited into a conduction band of the semiconductor material, thereby creating electron-hole pairs. Electrons formed on an n side of a p-n junction are generally prevented from crossing the p-n junction due to the electric field that is created in a depletion zone, while the corresponding holes are swept across the p-n junction by the electric field. Electrons formed on the p side of the p-n junction are swept across the junction by the electric field while the corresponding holes are prevented from crossing the junction by the electric field. When the semiconductor material is connected to a load, electrons formed on the n side of the junction or are swept across the junction from the p side are further swept via an anode through a circuit connected to the power converter. The electrons that flow through the circuit then flow into the p side via a cathode, where they can recombine with holes formed as part of the original electron-hole pairs.

SUMMARY

In general, the present disclosure provides several embodiments of a nuclear radiation particle power converter.

In one aspect, the present disclosure provides one embodiment of a power converter that includes first and second electrodes; a three-dimensional current collector disposed between the first and second electrodes and electrically coupled to the first electrode; and a charge carrier separator disposed on at least a portion of a surface of the three-dimensional current collector. The power converter further includes a hole conductor layer disposed on at least a portion of the charge carrier separator and electrically coupled to the second electrode; and nuclear radiation-emitting material disposed such that at least one nuclear radiation particle emitted by the nuclear radiation-emitting material is incident upon the charge carrier separator.

In another aspect, the present disclosure provides one embodiment of a method that includes forming a three-dimensional current collector between first and second electrodes, where the three-dimensional current collector is electrically coupled to the first electrode; forming a charge carrier separator on at least a portion of a surface of the three-dimensional current collector; and forming a hole conductor layer on at least a portion of the charge carrier separator, where the hole conductor layer is electrically coupled to the second electrode. The method further includes forming nuclear radiation-emitting material proximate the charge carrier separator such that at least one nuclear radiation particle emitted by the nuclear radiation-emitting material is incident upon the charge carrier separator.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure provides several embodiments of a nuclear radiation particle power converter. In one or more embodiments, the power converter can include nuclear radiation-emitting material that emits nuclear radiation particles whose energy can be converted to electrical energy, i.e., current, by the power converter. This nuclear radiation-emitting material can, e.g., emit alpha particles (a nuclear particle that includes two protons and two neutrons, e.g., a nucleus of a helium atom) via alpha decay, or beta particles (a high-energy electron) via beta decay. Although the power converters described in the present disclosure may be configured to convert any suitable nuclear radiation particle to electrical energy, the disclosure will focus on power converters for converting energy from beta particles into electrical energy, generally referred to as "betavoltaic power converters." Energy from the beta particles may be converted by the power converter using a charge carrier separator (e.g., quantum dots) that in one or more embodiments facilitates the separation of electron-hole pairs created by high energy electrons that are generated from the nuclear radiation-emitting material that decays by beta particle emission.

In one or more embodiments, the power converter can include a charge carrier separator disposed on at least a portion of a surface of a three-dimensional current collector that is disposed between first and second electrodes. A hole conductor layer can be disposed on at least a portion of the charge carrier separator. And in one or more embodiments, nuclear radiation-emitting material can be disposed such that at least one nuclear radiation particle emitted by the nuclear radiation-emitting material is incident upon the charge carrier separator.

Figure 1A:
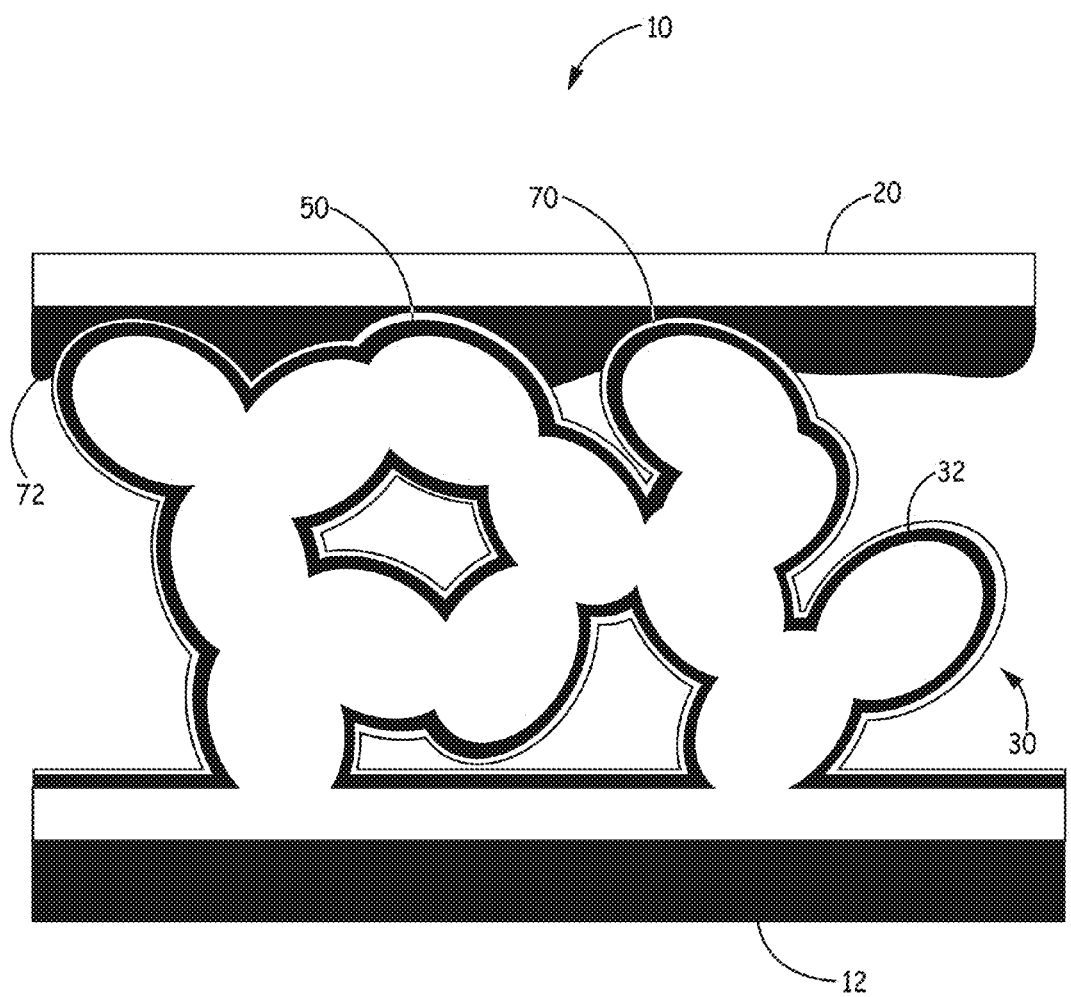
FIG. 1A is a schematic cross-section view of one embodiment of a power converter.
Figure 1B:
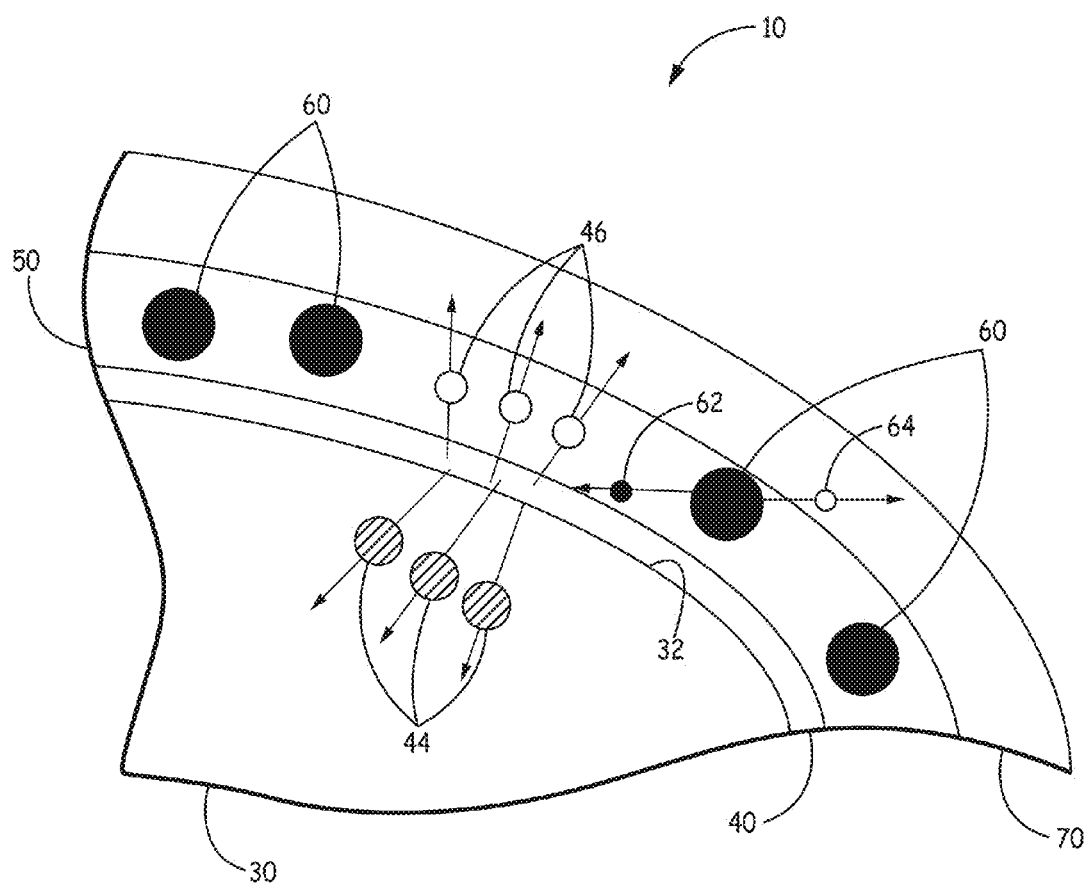
FIG. 1B is a schematic cross-section view of a portion of the power converter of FIG. 1A.

For example, FIGS. 1A-B are schematic cross-section views of one embodiment of a power converter 10, where FIG. 1B is an enlarged view of a portion of the power converter 10 of FIG. 1A. The power converter 10 includes a first electrode 12 and a second electrode 20. A three-dimensional current collector 30 is disposed between the first and second electrodes 12, 20 and, in one or more embodiments, electrically coupled to the first electrode. The power converter 10 can also include a charge carrier separator 40 (FIG. 1B) disposed, in one or more embodiments, on at least a portion of a surface 32 of the three-dimensional current collector 30. A hole conductor layer 50 can be disposed, e.g., on at least a portion of the charge carrier separator 40. In one or more embodiments, the hole conductor layer 50 is electrically coupled to the second electrode 20.

Power converter 10 can also include nuclear radiation-emitting material 60 (FIG. 1B). In one or more embodiments, the nuclear radiation-emitting material 60 can be disposed in any suitable location relative to the charge carrier separator 40 such that at least one nuclear radiation particle emitted by the nuclear radiation-emitting material is incident upon the charge carrier separator. For example, in one or more embodiments, the nuclear radiation material 60 can be disposed within at least one of the three-dimensional current collector 30, charge carrier separator 40, and the hole conductor layer 50. In one or more embodiments, the nuclear radiation material 60 can be formed such that a counter electrode 70 is positioned between the nuclear radiation material and the hole conductor layer 50 as is further described herein.

The first and second electrodes 12, 20 can take any suitable shape or shapes and include any suitable materials, e.g., metals, conductive polymers, other suitable electrical conductors, or combinations thereof. In one or more embodiments, the materials for the first electrode 12 and the three-dimensional current collector 30 can be selected such that the work functions of the materials prevent schottky barrier semiconductor/conductor interfaces from being formed. In one or more embodiments, the materials of the first electrode 12 and the three-dimensional current collector 30 can be selected and configured such that they form a schottky barrier or an ohmic contact. In one or more embodiments, the materials for the second electrode 20 and the hole conductor layer 50 and/or the counter electrode 70 can be selected such that the work functions of the materials prevent schottky barrier semiconductor/conductor interfaces from being formed. In one or more embodiments, the materials for the second electrode 20 and the hole conductor layer 50 and/or the counter electrode 70 can be selected and configured such that they form a schottky barrier or alternately form an ohmic contact.

In one or more embodiments, the first and second electrodes 12, 20 can electrically couple the power converter 10 to other devices using any suitable techniques. Further, either of the first or second electrodes 12, 20 can be positive or negative depending upon the application in which the power converter 10 is utilized.

Disposed between the first and second electrodes 12, 20 is the three-dimensional current collector 30. As used herein, a three-dimensional current collector is a structure or device that includes one or more surfaces that provide the collector with an extent in three dimensions and that is configured to receive or transmit a current on or through the one or more surfaces of the collector. In one or more embodiments, the three-dimensional current collector 30 can be constructed such that it provides a heterostructure with the charge carrier separator 40.

In one or more embodiments, the three-dimensional current collector 30 is electrically coupled to the first electrode 12. In one or more embodiments, the three-dimensional current collector 30 is electrically coupled to the second electrode 20. In one or more embodiments, the three-dimensional current collector 30 can be formed on the first electrode 12. In one or more embodiments, the collector 30 can be formed on the second electrode 20. In one or more embodiments, one or more intervening layers can be disposed between the three-dimensional current collector 30 and one or both of the first and second electrodes, 12, 20 that provides added functionality, e.g., a conductive layer, an adhesion layer, etc.

The three-dimensional current collector 30 can include any suitable material or materials. In one or more embodiments, the collector 30 can include a porous material. Further, in one or more embodiments, the collector 30 can include a high bandgap semiconductor material, e.g., $TiO_2$, $SnO_2$, $ZnO$, $WO_3$, $Nb_2O_5$, $Ta_2O_5$, $BaTiO_3$, $SrTiO_3$, $ZnTiO_3$, $CuTiO_3$, and combinations thereof. In one or more embodiments, the collector 30 can include graphite, graphene, $C_{60}$, $C_{70}$ and combinations thereof. Further, in one or more embodiments, the collector 30 can include a porous sintered $TiO_2$ material, a porous $Ti/TiO_2$ material, etc.

The three-dimensional current collector 30 can take any suitable shape or shapes. In one or more embodiments, the collector 30 can include nanorods, nanotubes, nanowires, nanocrystalline structures, metal foam, graphene foam, and combinations thereof. In one or more embodiments, the collector 30 can include a lithographically-patterned structure or other ordered structure such as those that can be manufactured using, e.g., 3D printing techniques. And the surface 32 of the collector 30 can take any suitable shape or shapes. In general, the three-dimensional current collector 30 can, in one or more embodiments, maximize a surface area of surface 32 for any given volume.

The power converter 10 can also include a charge carrier separator 40. The separator 40 can be disposed in any suitable location. For example, in the embodiment illustrated in FIGS. 1A-B, the separator 40 is disposed on at least a portion of the surface 32 of the three-dimensional current collector 30. The charge carrier separator 40 can be disposed on any suitable portion of the surface 32 of the three-dimensional current collector, e.g., the entire surface 32.

In one or more embodiments, the charge carrier separator 40 can be disposed within the hole conductor layer 50 such that it provides a three-dimensional structure but still is in contact with the three-dimensional current collector 30. In one or more embodiments, the charge carrier separator 40 and the three-dimensional current collector 30 can form a heterostructure.

The charge carrier separator 40 can include any suitable material or materials. In one or more embodiments, the separator 40 can include an oxide. In one or more embodiments, the separator 40 can be an oxide of the material used to form the three-dimensional current collector 30, e.g., $TiO_2$. In one or more embodiments, the charge carrier separator 40 can include nanocrystals. As used herein, the term "nanocrystal" refers to nanostructures that are substantially monocrystalline. A nanocrystal has at least one region or characteristic dimension with a dimension of less than about 500 nm, and down to on the order of less than about 1 nm. The terms "nanocrystal," "nanodot," "dot," and "quantum dot" are readily understood by the ordinarily skilled artisan to represent like structures and are used herein interchangeably. The present disclosure also encompasses the use of polycrystalline or amorphous nanocrystals. Typically, the region of characteristic dimension will be along the smallest axis of the structure. Nanocrystals can be substantially homogenous in material properties, or in some embodiments, can be heterogeneous.

The nanocrystals can be produced using any suitable technique or techniques. The nanocrystals for use in the present disclosure can also include any suitable material or materials, including an inorganic material, and more suitably an inorganic conductive or semiconductive material. Suitable semiconductor materials can include any type of semiconductor, including group II-VI, group III-V, group IV-VI and group IV semiconductors. Suitable semiconductor materials can include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and combinations thereof.

In one or more embodiments, the semiconductor nanocrystals can include a dopant such as a p-type dopant or an n-type dopant. The nanocrystals useful in the present disclosure can also include II-VI or III-V semiconductors. Examples of II-VI or III-V semiconductor nanocrystals include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table.

In one or more embodiments, the nanocrystals can include core-shell structures that are obtained by adding organometallic precursors containing the shell materials to a reaction mixture containing the core nanocrystal. In this case, rather than a nucleation-event followed by growth, the cores act as the nuclei, and the shells grow from their surfaces. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell nanocrystals can include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and combinations thereof. Exemplary core-shell luminescent nanocrystals include, but are not limited to, (represented as Core/Shell), CdSe/ZnS, InP/ZnS, PbSe/PbS, CdSe/CdS, CdTe/CdS, CdTe/ZnS, as well as others.

In one or more embodiments, the nanocrystals can include functionalized ligands to promote adhesion to the surface 32 of current collector 30 or to additional material of the charge carrier separator 40 as is further described herein. The ligands may also be used to facilitate bonding to the nuclear radiation-emitting material 60 as is also further described herein. The ligands may also facilitate charge transfer from the nanocrystals to at least one of the charge carrier separator 40, the current collector 30, and the hole conductor layer 50.

In one or more embodiments, the charge carrier separator 40 can be a layer that is formed or deposited onto the at least a portion of the surface 32 of three-dimensional current collector 30. In one or more embodiments, the charge carrier separator 40 can include two or more layers.

In one or more embodiments, the charge carrier separator 40 can include other types of structures, e.g., quantum wells, PN junctions, PIN junctions, schottky junctions, and perovskite structures. And in one or more embodiments, the charge carrier separator 40 can include two or more types of materials, e.g., an oxide layer combined with nanocrystals, two or more different types of nanocrystals, one or more quantum wells combined with nanocrystals, etc., as is further described herein.

The power converter 10 can also include the hole conductor layer 50. In one or more embodiments, the hole conductor layer 50 is disposed on at least a portion of the charge carrier separator 40. Further, in one or more embodiments, the hole conductor layer 50 is disposed on at least a portion of the surface 32 of the three-dimensional current collector 30. And in one or more embodiments, the hole conductor layer 50 can be disposed on at least a portion of the charge carrier separator 40 and at least a portion of the surface 32 of the three-dimensional current collector 30. In one or more embodiments, the hole conductor layer 50 can be disposed on at least a portion of the surface 32 of the three-dimensional current collector 30, and the charge carrier separator 40 can be disposed within the hole conductor layer such that it is electrically coupled with the current collector 30. In one or more embodiments, the hole conductor layer 50 is electrically coupled to the second electrode 20 to provide an electrical pathway for one or both of the electrons and holes emitted by the charge carrier separator 40.

The hole conductor layer 50 can include any suitable material or materials. For example, in one or more embodiments, the hole conductor layer 50 can include any suitable p-type semiconductor material, e.g., $CsSnI_3$, ZnO, CuSCN, doped or undoped graphene, hole conducting hole transport medium (i.e., hole conductor, hole transport medium) such as PTAA or PEDOT, and liquid redox shuttles such as $I-/I_3-$. The term "p-type" or "p-doped" as used in this disclosure refer to a semiconductor material that includes a dopant that provides for excess holes to act as positive, or "p-type," mobile charge carriers. In one example, a p-type dopant can accept an electron from the semiconductor material. The p-type semiconductor material may also be made of intrinsic p-type material.

Further, the terms "n-doped" or "n-type" as they are used in this disclosure refer to a semiconductor material that includes a dopant that provides for excess electrons to act as negative, or "n-type," mobile charge carriers. In one example, an n-type dopant can donate one or more valence electrons to a semiconductor material. The n-type semiconductor material may also be made of intrinsic n-type material.

The power converter 10 can also include nuclear radiation-emitting material 60. The material 60 can be disposed in any suitable location. For example, in one or more embodiments, the material 60 can be disposed proximate the charge carrier separator 40 to minimize losses in particle energy. As used herein, the phrase "proximate the charge carrier separator" means that the nuclear radiation-emitting material is disposed such that at least one nuclear radiation particle emitted by the nuclear radiation-emitting material is incident upon the charge carrier separator. For example, in one or more embodiments, the material 60 can be disposed within at least one of the three-dimensional current collector 30, charge carrier separator 40, and hole conductor layer 50 (as illustrated in FIG. 1B). In one or more alternative embodiments, the material 60 can be disposed such that a counter electrode 70 is between the material 60 and the charge carrier separator 40 (see, e.g., power converter 600 of FIG. 6).

The nuclear radiation-emitting material 60 can include any suitable material or materials. In one or more embodiments, the nuclear radiation-emitting material 60 can include a plurality of radiation-emitting radioisotopes, e.g., tritium $^3$H, $^{60}$Co, $^{63}$Ni, $^{90}$Sr, $^{99}$Tc, $^{127}$Cs and combinations thereof. And the material 60 can emit any suitable type of particles, e.g., alpha, beta, gamma, x-ray, etc.

In one or more embodiments, the power converter 10 can include optional counter electrode 70 disposed between the hole conductor layer 50 and second electrode 20. The counter electrode 70 can be electrically coupled to the hole conductor layer 50. In one or more embodiments, the counter electrode 70 can electrically couple the hole conductor layer 50 and the second electrode 20. In one or more embodiments, the counter electrode 70 can be in contact with the second electrode 20. In one or more embodiments, the counter electrode can be electrically coupled to the second electrode 20 through a conductive adhesive 72 (FIG. 1A). Further, in one or more embodiments, the counter electrode 70 can be electrically coupled to the hole conductor layer 50 through a conductive adhesive (not shown). And in one or more embodiments, the counter electrode 70 can serve as the second electrode, thereby replacing second electrode 20.

The counter electrode 70 can include any suitable material or materials, e.g., Au, Pt, graphene, a metallic material, a conducting polymer, a semiconductor, or combinations thereof.

The power converter 10 can include any other suitable layer or layers. For example, in one or more embodiments, the power converter 10 can include one or more absorption layers for absorbing nuclear radiation particles that are emitted by the nuclear radiation-emitting material 60 to prevent the release of nuclear radiation particles from the power converter. Such one or more absorbing layers may also absorb bremsstrahlung (x-rays) resulting from the deceleration of nuclear radiation particles emitted by the nuclear radiation-emitting material 60.

While not wishing to be bound by any particular theory, the power converter 10 can provide a current to a device or system that is electrically coupled to the converter by converting energy from radioactive decay of the nuclear radiation-emitting material 60 into electrical energy. For example, in reference to FIG. 1B, the nuclear radiation-emitting material 60 can emit one or more nuclear radiation particles 62, e.g., an electron, along with an antineutrino 64 as the material 60 decays. The particle 62 can generate electron/hole pairs 44/46 in the charge carrier separator 40 through, e.g., impact ionization. One or more liberated electrons 44 or excitons can be injected into a conduction band of the three-dimensional current collector 30. The collector 30 can direct these liberated electrons 44 to the first electrode 12 (FIG. 1A) before the liberated electrons 44 can recombine with their associated holes 46. The hole conductor layer 50 can fill the holes 46, i.e., electron vacancies, in the charge carrier separator 40 by replenishing the separator 40 with electrons. This replenishing of electrons can aid in preventing recombination of electron-hole pairs 44/46 before the liberated electrons 44 can be collected by the collector 30. In one or more embodiments, the electrons 44 can be absorbed by the three-dimensional current collector 30 more quickly than the electrons can recombine with the associated holes 46, thereby also helping to prevent the electron-hole pairs from recombining.

Figure 2:
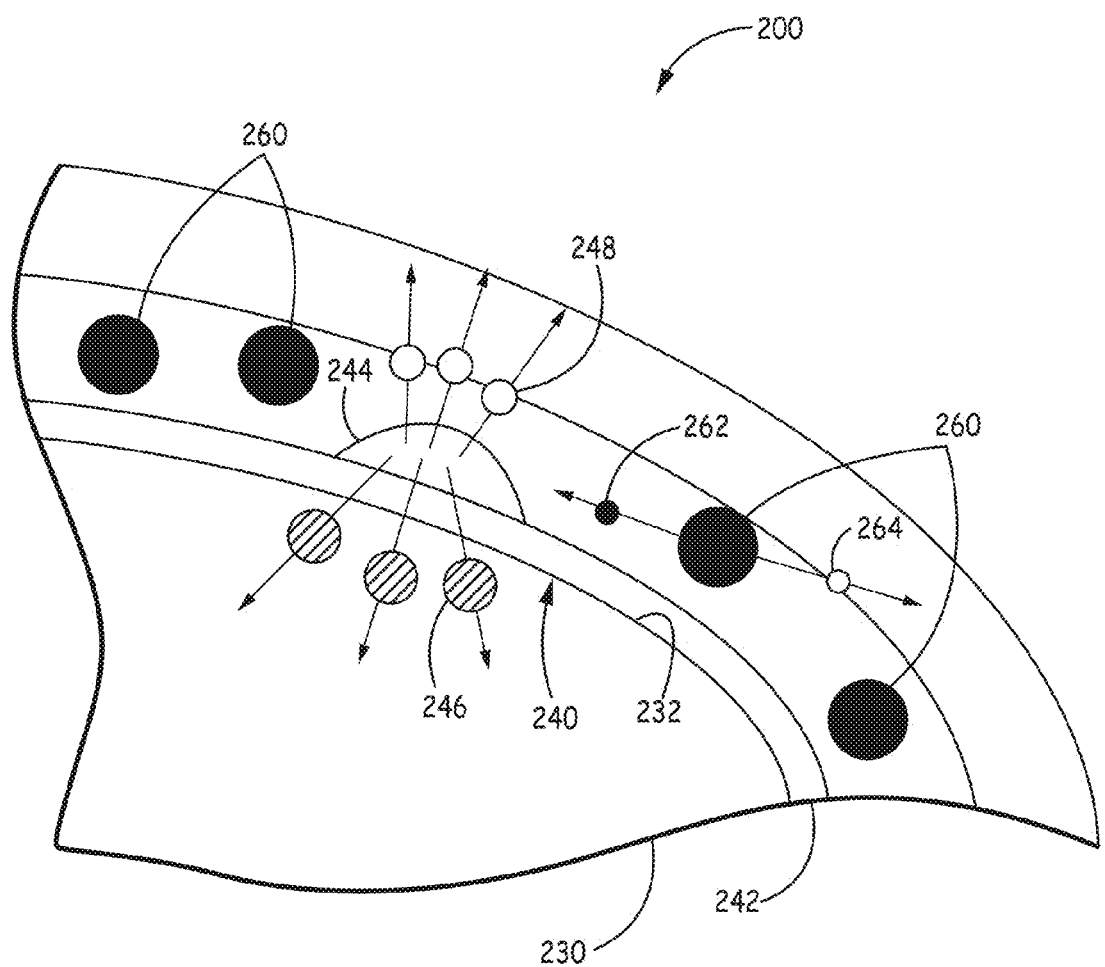
FIG. 2 is a schematic cross-section view of a portion of another embodiment of a power converter.

As mentioned herein, the power converters of the present disclosure can include any suitable material or combination of materials for the charge carrier separator. For example, FIG. 2 is a schematic cross-section view of a portion of one of embodiment of a power converter 200. The power converter 200 is similar in many aspects to power converter 10 illustrated in FIGS. 1A-B. All of the design considerations and possibilities regarding the power converter 10 of FIGS. 1A-B apply equally to the power converter 200 of FIG. 2.

One difference is that power converter 200 includes a charge carrier separator 240 that includes a first material 242 disposed on at least a portion of a surface 232 of a three-dimensional current collector 230, and a second material 244. In the embodiment illustrated in FIG. 2, the second material 244 is disposed on at least a portion of the first material 242. In one or more embodiments, the second material 244 can be disposed within the first material 242, or spaced apart from the first material 242.

Charge carrier separator 240 can include any suitable material or combination of materials. For example, in one or more embodiments, the first material 242 can include an oxide, e.g., an oxide of the material utilized for the three-dimensional current collector 230, and the second material 244 can include quantum dots as described herein.

While not wishing to be bound by any particular theory, the power converter 200 can convert energy from nuclear radiation-emitting material 260 into electrical energy by, e.g., impact ionization. For example, nuclear radiation-emitting material 260 can emit nuclear radiation particle 262 (e.g., an electron) and an antineutrino 264. The particle 262 is incident upon at least one of the first material 242 and the second material 244 of the charge carrier separator 240. The impact of the particle 262 on one or both of materials 242, 244 can cause the formation of at least one electron-hole pair 246/248. The electrons 246 from the pairs 246/248 can be directed by the three-dimensional current collector 230 to an electrode (not shown) as is further described herein.

Figure 3:
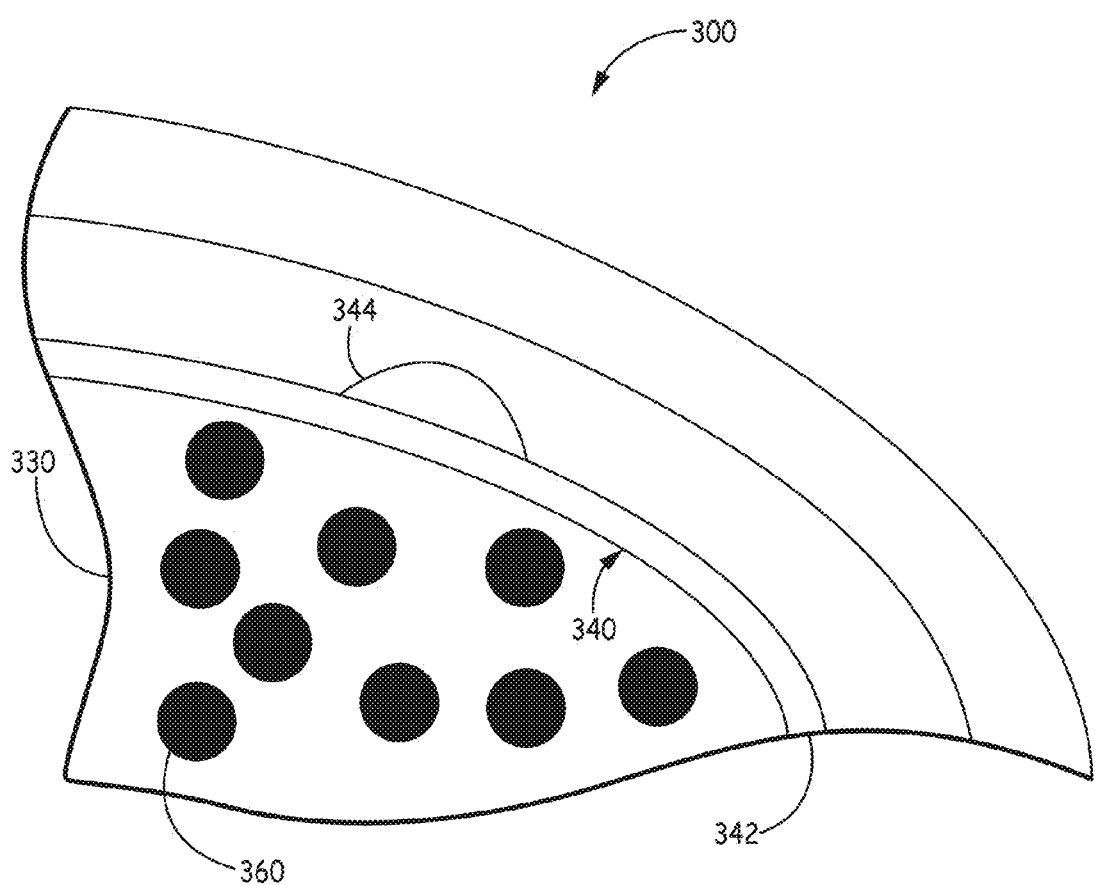
FIG. 3 is a schematic cross-section view of a portion of another embodiment of a power converter.

As mentioned herein, the power converters of the present disclosure can include nuclear radiation-emitting material that can be disposed in any suitable location such that at least one nuclear radiation particle emitted by the nuclear radiation-emitting material is incident upon a charge carrier separator. For example, FIG. 3 is a schematic cross-section view of a portion of another embodiment of a power converter 300. All of the design considerations and possibilities regarding the power converters 10 and 200 of FIGS. 1A-B and FIG. 2 apply equally to the power converter 300 of FIG. 3. One difference is that power converter 300 includes nuclear radiation-emitting material 360 disposed in three-dimensional current collector 330. Any suitable technique or combination of techniques can be utilized to provide nuclear radiation-emitting material 360 within three-dimensional current collector 330. The nuclear radiation-emitting material 360 is disposed such that at least one nuclear radiation particle emitted by the nuclear radiation-emitting material 360 is incident upon at least one of first material 342 and second material 344 of charge carrier separator 340.

Figure 4:
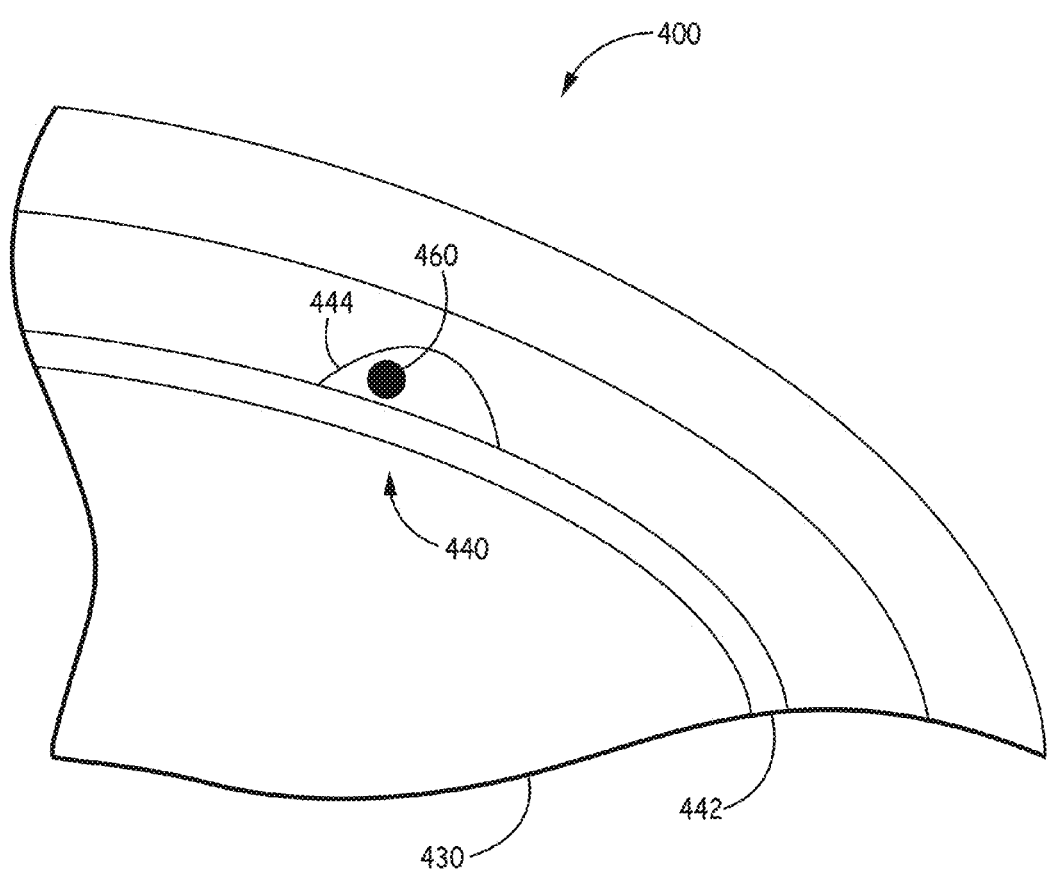
FIG. 4 is a schematic cross-section view of a portion of another embodiment of a power converter.

Further, in one or more embodiments, nuclear radiation-emitting material can be disposed within charge carrier separator material. For example, FIG. 4 is a schematic cross-section view of a portion of a power converter 400. All of the design considerations and possibilities regarding the power converters 10 and 200 as illustrated in FIGS. 1A-B and FIG. 2 apply equally to the power converter 400 of FIG. 4. As illustrated in FIG. 4, nuclear radiation emitting material 460 is disposed within second material 444 of charge carrier separator 440. Any suitable technique or combination of techniques can be utilized to dispose nuclear radiation-emitting material within second material 444. As previously described herein, nuclear radiation-emitting material 460 is disposed within second material 444 such that at least one nuclear radiation particle emitted by the nuclear radiation-emitting material is incident upon at least one of first material 442 and second material 444 of the charge carrier separator 440. In one or more embodiments, the charge carrier separator 440 can be disposed on at least a portion of a surface of three-dimensional current collector 430.

Figure 5:
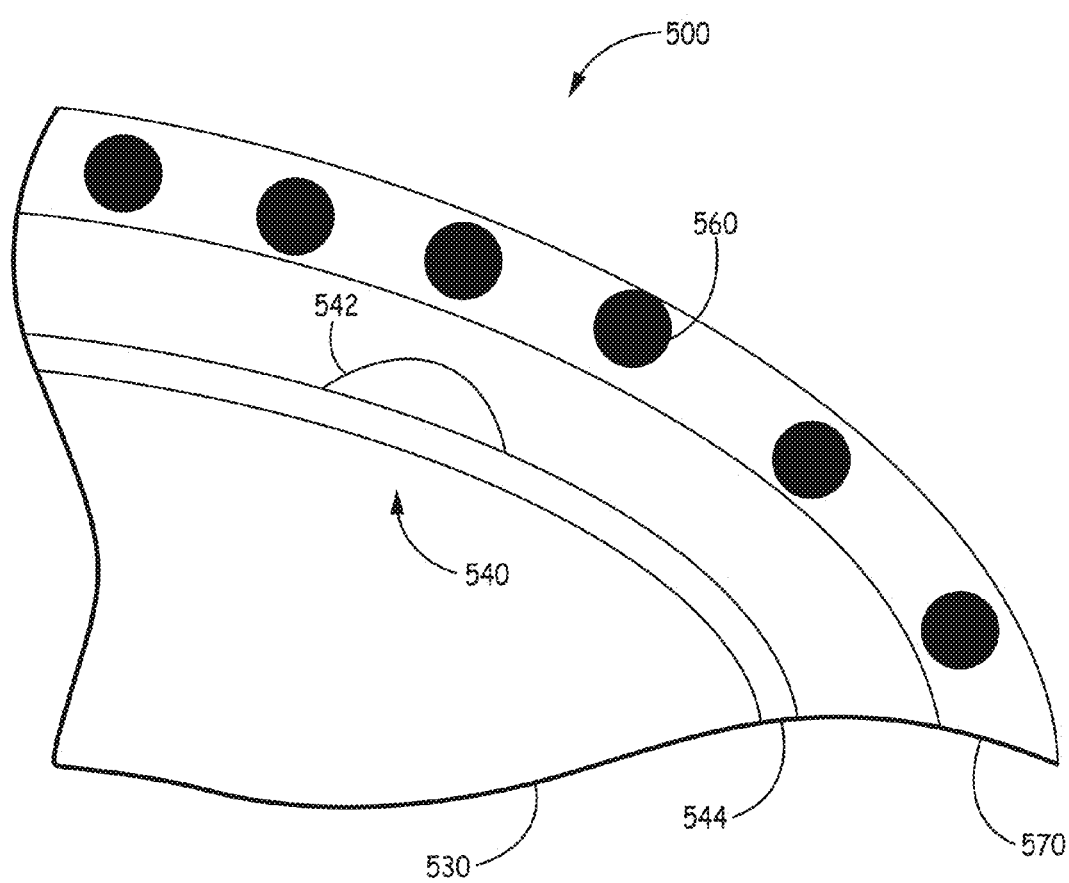
FIG. 5 is a schematic cross-section view of a portion of another embodiment of a power converter.

Nuclear radiation-emitting material can also be disposed within a counter electrode. For example, FIG. 5 is a schematic cross-section view of a portion of a power converter 500. The power converter 500 can include any suitable power converter, e.g., power converters 10 and 200. All of the design considerations and possibilities regarding power converters 10 and 200 of FIGS. 1A-B and FIG. 2 apply equally to power converter 500 of FIG. 5. As illustrated in FIG. 5, nuclear radiation-emitting material 560 is disposed within counter electrode 570 such that at least one nuclear radiation particle emitted by the nuclear radiation-emitting material is incident upon at least one of first material 542 and second material 544 of charge carrier separator 540. Nuclear radiation-emitting material 560 can be disposed within counter electrode 570 using any suitable technique or combination of techniques. In one or more embodiments, the charge carrier separator 540 can be disposed on at least a portion of a surface of three-dimensional current collector 530.

Figure 6:
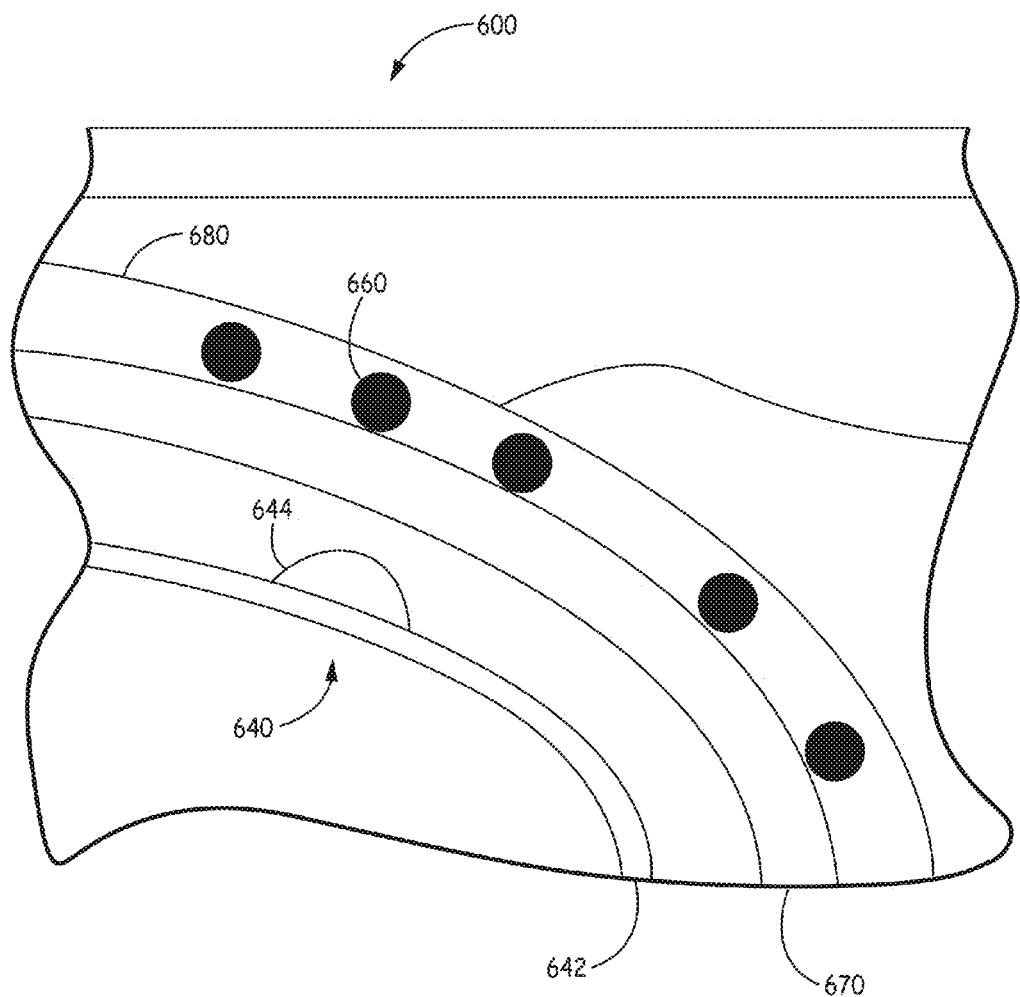
FIG. 6 is a schematic cross-section view of a portion of another embodiment of a power converter.

Nuclear radiation-emitting material of the power converters described herein can also be disposed such that a counter electrode is between the nuclear radiation-emitting material and the charge carrier separator. For example, FIG. 6 is a schematic cross-section view of a portion of a power converter 600. All of the design considerations and possibilities regarding the power converters 10 and 200 as illustrated in FIGS. 1A-B and FIG. 2 apply equally to power converter 600 of FIG. 6. As illustrated in FIG. 6, nuclear radiation-emitting material 660 is disposed in matrix 680 adjacent counter electrode 670. The nuclear radiation-emitting material 660 is disposed such that the counter electrode 670 is between the nuclear radiation-emitting material and a charge carrier separator 640. The nuclear radiation-emitting material 660 is disposed such that at least one nuclear radiation particle emitted by the nuclear radiation-emitting material is incident upon at least one of first material 642 and second material 644 of the charge carrier separator 640. The nuclear radiation-emitting material 660 and matrix 680 can be disposed on the counter electrode 670. Alternatively, one or more intervening layers can be disposed between the nuclear radiation-emitting material 660 and matrix 680, and the counter electrode 670. The matrix 680 can include any suitable material or materials, e.g., polymers such as paraffin, liquids such as water, solids such as metals and oxides, etc.

Any suitable technique or combination of techniques can be utilized to produce the power converters described herein. Referring to FIGS. 1A-B, the three-dimensional current collector 30, in one or more embodiments, can be formed between the first and second electrodes 12, 20. The collector 30 can be formed using any suitable technique or combination of techniques, e.g., sintering, pressing, electrophoresis, anodic growth, cathodic reduction, etching, photolithography, 3D printing, or combinations thereof. As mentioned herein, the collector 30 can be formed on either of the first and second electrodes 12, 20. In one or more embodiments, the three-dimensional current collector 30 is electrically coupled to the first electrode 12.

The charge carrier separator 40 can be formed on at least a portion of the surface 32 of the three-dimensional current collector 30 using any suitable technique or combination of techniques, e.g., anodization, drop coating, atomic layer deposition (ALD), sequential ionic layer adsorption, reaction (SILAR), chemical bath deposition (CBD) or combinations thereof. The three-dimensional current collector 30 and the charge carrier separator 40 can form a hetero structure.

The hole conductor layer 50 can be formed on at least a portion of the charge carrier separator 40. In one or more embodiments, the hole conductor layer 50 is formed using any suitable technique or combination of techniques, e.g., drop coating, atomic layer deposition (ALD), sequential ionic layer adsorption and reaction (SILAR), chemical bath deposition (CBD) or combinations thereof.

The nuclear radiation-emitting material 60 can be formed proximate the charge carrier separator 40. In one or more embodiments, the nuclear radiation-emitting material 60 can be formed within or attached to at least one of the three-dimensional current collector 30, the charge carrier separator 40, and the hole conductor layer 50 using any suitable technique or combination of techniques, e.g., exposure to a gaseous form of the material 60 (e.g., tritium gas) under pressure and/or heat, electroplating, synthesis, or combinations thereof. In one or more embodiments, the nuclear radiation-emitting material 60 can be formed within the three-dimensional current collector 30 by depositing tritiated paraffin wax onto the current collector.

In one or more embodiments, the optional counter electrode 70 can be formed between the hole conductor layer 50 and the second electrode 20 such that the counter electrode electrically couples the hole conductor layer 50 and the second electrode 20. Any suitable technique or combination of techniques can be utilized to form the counter electrode 70, e.g., drop coating (if liquid), atomic layer deposition (ALD), etc. In one or more embodiments, where the nuclear radiation-emitting material 60 is formed such that the counter electrode 70 is between the material 60 and the charge carrier separator 40, the material can be formed, e.g., on the counter electrode using any suitable technique or combination of techniques. For example, in one or more embodiments, the nuclear radiation-emitting material 60 can be formed on the counter electrode 70 by depositing tritiated paraffin wax onto the counter electrode.

The various elements of the power converter can be formed in any suitable order. For example, in one or more embodiments, the counter electrode 70 can be formed first, followed by the hole conductor layer 50, the charge separator 40, current collector 30, and the first and second electrodes 12, 20. In one or more embodiments, it may be advantageous to dispose the nuclear radiation-emitting material 60 in the desired location at the end of the process to help prevent the material 60 from degrading other elements of the power converter.

Figure 7:
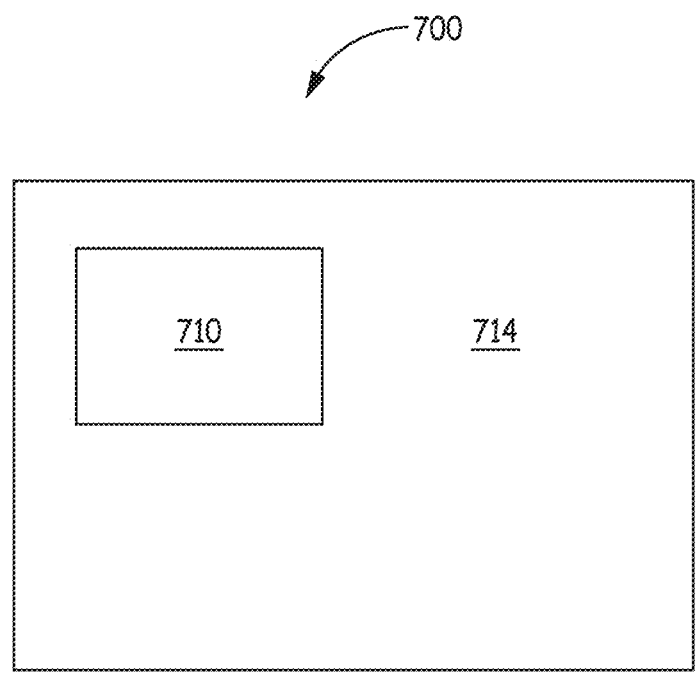
FIG. 7 is a schematic cross-section view of one embodiment of an implantable medical device that includes a power converter.

The various embodiments of power converters described herein can be utilized as a current source for any suitable devices or systems. For example, FIG. 7 is a schematic cross-section of one embodiment of an implantable medical device system 700 that includes a power converter 710 and an implantable medical device 714. The power converter 710 can include any suitable power converter described herein, e.g., power converter 10 of FIGS. 1A-B. The implantable medical device 714 can include any suitable medical device, e.g., electrocardiogram (ECG) monitors, sensors (such as glucose, pressure), implantable pulse generators (IPGs) (e.g., pacemakers), implantable cardioverter defibrillators (ICDs), etc. Although not shown, the power convertor 710 can be electrically coupled to the implantable medical device 714 using any suitable technique or combination of techniques.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A power converter comprising:
    first and second electrodes;
    a three-dimensional current collector disposed between the first and second electrodes and electrically coupled to the first electrode;
    a charge carrier separator disposed on at least a portion of a surface of the three-dimensional current collector;
    a hole conductor layer disposed on at least a portion of the charge carrier separator and electrically coupled to the second electrode;
    a counter electrode disposed between the hole conductor layer and the second electrode and electrically coupling the hole conductor layer and the second electrode; and
    nuclear radiation-emitting material disposed such that at least one nuclear radiation particle emitted by the nuclear radiation-emitting material is incident upon the charge carrier separator;
    wherein the charge carrier separator is adapted to separate electron-hole pairs generated in the charge carrier separator by impact of the at least one nuclear radiation particle on the charge carrier separator, and further wherein at least a portion of the nuclear radiation-emitting material is disposed such that the counter electrode is between the nuclear radiation-emitting material and the charge carrier separator.

2. The power converter of claim 1, wherein the counter electrode is electrically coupled to the second electrode with a conductive adhesive.

3. The power converter of claim 1, wherein at least a portion of the nuclear radiation-emitting material comprises tritium.

4. The power converter of claim 1, wherein at least a portion of the charge carrier separator comprises quantum dots.

5. The power converter of claim 1, wherein the three-dimensional current collector comprises a porous $Ti/TiO_2$ material.

6. The power converter of claim 1, wherein the hole conductor layer comprises a p-type semiconductor material comprising CuSCN.

7. The power converter of claim 1, wherein at least a portion of the nuclear radiation-emitting material is disposed within the three-dimensional current collector.

8. The power converter of claim 1, wherein at least a portion of the nuclear radiation-emitting material is disposed within the hole conductor layer.

9. The power converter of claim 1, wherein the charge carrier separator comprises a first material and a second material.

10. The power converter of claim 9, wherein the first material is disposed on the at least a portion of the surface of the three-dimensional current collector and the second material is disposed on at least a portion of the first material.

11. The power converter of claim 10, wherein the first material comprises an oxide and the second material comprises quantum dots.

12. An implantable medical device comprising the power converter of claim 1.

13. A power converter comprising:
    first and second electrodes;
    a three-dimensional current collector disposed between the first and second electrodes and electrically coupled to the first electrode;
    a charge carrier separator disposed on at least a portion of a surface of the three-dimensional current collector;
    a hole conductor layer disposed on at least a portion of the charge carrier separator and electrically coupled to the second electrode;
    a counter electrode disposed between the hole conductor layer and the second electrode and electrically coupling the hole conductor layer and the second electrode; and
    nuclear radiation-emitting material disposed such that at least one nuclear radiation particle emitted by the nuclear radiation-emitting material is incident upon the charge carrier separator;
    wherein the charge carrier separator is adapted to separate electron-hole pairs generated in the charge carrier separator by impact of the at least one nuclear radiation particle on the charge carrier separator, and further wherein at least a portion of the nuclear radiation-emitting material is disposed between the hole conductor layer and the counter electrode.

14. The power converter of claim 13, wherein at least a portion of the charge carrier separator comprises quantum dots.

15. The power converter of claim 13, wherein the three-dimensional current collector comprises a porous $Ti/TiO_2$ material.

* * * * *